(12) United States Patent
van den Heuvel et al.

(10) Patent No.: US 8,706,357 B1
(45) Date of Patent: Apr. 22, 2014

(54) FLIGHT RECORDER DEPLOYMENT SYSTEM AND METHOD

(71) Applicant: DRS C3 & Aviation Company, Herndon, VA (US)

(72) Inventors: Blake van den Heuvel, Herndon, VA (US); Ari Kaufmann, Herndon, VA (US); Vincent James O'Hara, Herndon, VA (US)

(73) Assignee: DRS C3 & Aviation Company, Herndon, VA (US)

( * ) Notice: Subject to any disclaimer, the term of this patent is extended or adjusted under 35 U.S.C. 154(b) by 0 days.

(21) Appl. No.: 13/830,248

(22) Filed: Mar. 14, 2013

(51) Int. Cl.
  *B60R 22/32* (2006.01)
  *G06F 7/00* (2006.01)
  *G06F 19/00* (2011.01)

(52) U.S. Cl.
  USPC ............................ 701/45; 701/14; 701/32.2

(58) Field of Classification Search
  None
  See application file for complete search history.

(56) References Cited

U.S. PATENT DOCUMENTS

| | | | |
|---|---|---|---|
| 3,140,847 A | | 7/1964 | Ames, Jr. |
| 5,845,975 A | * | 12/1998 | Wells ............................ 303/126 |
| 5,928,300 A | * | 7/1999 | Rogers et al. ................... 701/45 |
| 6,092,008 A | * | 7/2000 | Bateman ........................ 701/14 |
| 6,628,995 B1 | * | 9/2003 | Korson et al. .................. 700/74 |
| 2004/0011580 A1 | * | 1/2004 | Miyata et al. .................. 180/274 |
| 2007/0075919 A1 | * | 4/2007 | Breed .............................. 345/8 |
| 2012/0113575 A1 | | 5/2012 | Uy et al. |
| 2012/0138741 A1 | | 6/2012 | Fabre et al. |
| 2012/0166037 A1 | * | 6/2012 | Vinue Santolalla et al. . 701/32.2 |
| 2012/0310487 A1 | | 12/2012 | Thomas et al. |

FOREIGN PATENT DOCUMENTS

| | | |
|---|---|---|
| CA | 530127 | 9/1956 |
| CA | 575533 | 5/1959 |
| CA | 610741 | 12/1960 |
| CA | 886721 | 11/1971 |
| CA | 898617 | 4/1972 |
| CA | 1256916 | 7/1989 |

OTHER PUBLICATIONS

CPI-406 Deployable Emergency Locator Transmitter (EL T). Datasheet [Online]. DRS C3 Aviation Cpmany, [retrieved on Nov. 20, 2013]. Retrieved from the internet <http://www.drs.com/Products/c3a/CPI406.aspx>., 2 pages. Ealiest known date of availability, Jul. 18, 2010.*

Deployable Flight Incident Recorder Set (DFIRS) 2100. Datasheet [Online]. DRS C3 Aviation Cpmany, [retrieved on Nov. 20, 2013]. Retrieved from the internet <http://www.drs.com/Products/c3a/DFIRS2100.aspx>., 2 pages. Ealiest known date of availability, Sep. 4, 2010.*

(Continued)

*Primary Examiner* — John R Olszewski
*Assistant Examiner* — Jess Whittington
(74) *Attorney, Agent, or Firm* — Kilpatrick Townsend & Stockton LLP (57) ABSTRACT

Embodiments of the invention provides an automatic deployable flight recorder (ADFR) system that includes a deployable fight recorder, a plurality of crash sensors, and a recorder release unit. The recorder release unit is communicatively coupled to the deployable fight recorder and the plurality of crash sensors, and is configured to initiate deployment of the deployable flight data recorder from an aircraft when a deployment criteria that is adjusted based on a flight condition of the aircraft is satisfied.

25 Claims, 6 Drawing Sheets

(56) References Cited

OTHER PUBLICATIONS

Emergency Avionics System 3000 (EAS3000). Datasheet.[Online]. DRS C3 Aviation Cpmany, [retrieved on Nov. 20, 2013]. Retrieved from the internet <http://www.drs.com/Products/c3a/EAS3000.aspx>., 2 pages. Ealiest known date of availability, Jul. 21, 2010.*

ELB3000F and EAS3000F Emergency Locator/Recorder System. Datasheet. DRS C3 Aviation Cpmany, [retrieved on Nov. 27, 2013]. Retrieved from the internet <http://www.drs.com/Products/c3a/3000f.aspx>., 4 pages. Ealiest known date of availability, Sep. 4, 2010.*

Cornillou, Jean-Charles (2011). *International Cospas-Sarsat Programme: From operations to MEOSAR prospects* [*PowerPoint slides*]. Retrieved from the Ifremer website: <http://www.ifremer.fr/web-com/sar2011/Presentations/SARWS2011_CORNILLOU.pdf>, 23 pages.

Deployable Flight Data Recorder System. Datasheet [online]. Fairchild Controls, Inc. [retrieved on Apr. 15, 2013]. Retrieved from the Internet: <http://www.fairchild-controls.com/wp-content/uploads/2011/10/FC-VFDRS-brochure.pdf>, 2 pages.

Automatic Deployable Flight Recorder (ADFR). Datasheet. DRS Technologies, Inc., DRS Integrated Defense Systems and Services (IDSS) Group. Nov. 15, 2012 2 pages.

* cited by examiner

FLIGHT RECORDER DEPLOYMENT SYSTEM AND METHOD

CROSS-REFERENCES TO RELATED APPLICATIONS

NOT APPLICABLE

BACKGROUND

In a catastrophic aviation event involving a downed aircraft, a flight recorder is one of the most useful tools for investigators to piece together the crucial moments leading up to the aircraft accident or incident to determine the cause of the crash. One type of flight recorder is a cockpit voice recorder (CVR) that records the audio environment of the flight deck of an aircraft. A CVR records conversations in the cockpit and communications between the cockpit crew and others such as air traffic control personnel on the ground. Another type of flight recorder is a flight data recorder (FDR) that records the status of and information about the electronic and mechanical equipment of the aircraft. A FDR records information such as flight parameters (e.g., altitude, speed, etc.) of the aircraft, and may include propulsion system information such as engine performance data, or other avionics information useful in assisting investigators to determine the cause of a crash.

A flight recorder is designed to withstand high impact forces and high temperatures such that the flight recorder is likely to survive the conditions of a crash. However, while a flight recorder is designed to survive a crash, there is still a probability that the flight recorder may not survive if the crash conditions are extreme enough. Furthermore, a flight recorder is only useful for investigators if the flight recorder can be located after a crash. For example, when an aircraft crashes at sea and is submerged in water, locating the flight recorder affixed to the downed aircraft can take weeks to months, and even years, and can be costly in terms of the amount of money and time spent in locating the flight recorder. Even when an aircraft crashes on land, it may take significant effort and time to locate the flight recorder, for example, when the crash site is an unfamiliar or rough terrain. Such delay in locating the flight recorder not only frustrates investigators but can also risk the safety of other aircrafts. For example, when a catastrophic aviation event is caused by a design flaw in an aircraft component, the delay in identifying the problematic aircraft component can risk the safety of other aircrafts that employ the same type of aircraft component.

To improve the chances of locating a flight recorder after a catastrophic aviation event, a flight recorder can be designed to deploy and separate from the aircraft during a crash. However, most deployable flight recorders are designed to deploy from the aircraft even at the slightest possibility of an aircraft crash, resulting in a high risk of false-positive crash detections. This can cause non-commanded or unintended deployment of the flight recorder, and in some instances, has resulted in injuries to maintenance workers while the aircraft is being serviced on the ground.

Embodiments of the invention address these and other problems, individually and collectively.

BRIEF SUMMARY

Embodiments of the invention are directed to automatic deployable flight data recorder systems and methods for automatically initiating deployment of a flight recorder from an aircraft. Embodiments of the invention provide a more robust crash detection system that reduces the likelihood of non-commanded or unintended deployment of a flight recorder from an aircraft while maintaining a high reliability of deployment in a catastrophic crash event.

According to some embodiments, an automatic deployable flight recorder (ADFR) system includes a deployable fight recorder, multiple crash sensors placed at various locations on the aircraft, and a recorder release unit. The recorder release unit is communicatively coupled to the deployable fight recorder and the crash sensors, and is configured to initiate deployment of the deployable flight data recorder from an aircraft when a deployment criteria is satisfied. The deployment criteria can be adjusted based on a flight condition of the aircraft.

According to some embodiments, a recorder release unit includes one or more deployment circuits for transmitting a deployment signal to deploy a fight recorder from an aircraft, and a deployment controller coupled to the one or more deployment circuits. The deployment controller includes a sensor monitoring module and a sensitivity selection module. The sensor monitoring module enables the deployment circuits to transmit the deployment signal when crash sensor data from crash sensors indicate a deployment criteria corresponding to a sensitivity state of the sensor monitoring module is satisfied. The sensitivity selection module sets the sensitivity state of the sensor monitoring module to be in one of multiple sensitivity states based on the flight status information of the aircraft.

According to some embodiments, a method for activating deployment of a deployable flight recorder from an aircraft using multiple crash sensors on the aircraft includes determining a flight condition of the aircraft and determining one of multiple crash risk levels of an aircraft based on the flight condition of the aircraft. The deployment of the deployable flight recorder from the aircraft is activated when a deployment criteria corresponding to the determined crash risk level is satisfied as indicated by the crash sensor data received from the multiple crash sensors.

DETAILED DESCRIPTION

Embodiments of the present invention discloses improved automatic deployable flight recorder (ADFR) systems and methods to provide a more robust crash detection system that reduces the likelihood of non-commanded or unintended deployment of a flight recorder from an aircraft while maintaining a high reliability of deployment in a catastrophic crash event. Embodiments of the ADFR system utilizes sensor type and location diversity, sensor type flexibility and differentiation, sensor fault monitoring, components redundancy, and voting logic to improve the reliability of the ADFR system. Furthermore, the deployment criteria for deploying a flight recorder in embodiments of the invention can be adjusted based on the flight conditions of the aircraft and warning signals from aircraft warning systems to improve detection of a crash event and to reduce the possibility of false-positive triggers.

Exemplary ADFR Systems and Crash Sensors

Figure 1:
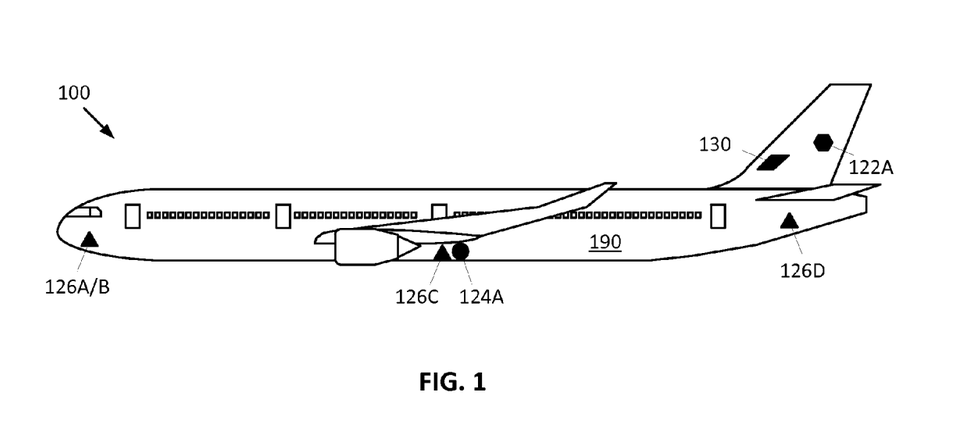
FIG. 1 illustrates an automatic deployable flight recorder (ADFR) system on an aircraft according to some embodiments.

FIG. 1 illustrates an ADFR system 100 on an aircraft 190 according to various embodiments of the invention. The ADFR system 100 includes a deployable flight recorder 130 on the vertical tail fin of aircraft 190 and crash sensors 122A, 124A, and 126A-D installed at various location on aircraft 190. The deployable flight recorder 130 is designed to deploy and separate from aircraft 190 when crash sensors 122A, 124A, and 126A-D working in a cooperative manner indicate that a deployment criteria (i.e. a deployment condition to initiate deployment of deployable flight recorder 130) is satisfied. According to various embodiments, the deployment criteria is based on a crash risk level of an aircraft. The crash risk level of an aircraft changes depending on the flight condition of the aircraft. For example, the crash risk level of an aircraft is different when the aircraft is on the ground than when the aircraft is taking off or landing, or when the aircraft is in flight at a cruising altitude or at a cruising speed. Thus, the deployment criteria of the ADFR system 100 changes depending on the flight condition of aircraft 190.

In some embodiments, deployable flight recorder 130 is advantageously installed near the leading edge of the root of the vertical tail fin of aircraft 190 as shown in FIG. 1. Such a location allows the deployable flight recorder 130 to safely separate from an aircraft without impacting the body of the aircraft when deployed during a crash under a variety of different flight conditions such as when the aircraft is climbing (e.g., during takeoff), descending (e.g., during landing), or in flight at a cruising altitude. Although the location of deployable flight recorder 130 as shown in FIG. 1 is optimized to allow safe deployment from aircraft 190, deployable flight recorder 130 can alternatively be installed at other locations of aircraft 190. For example, in other embodiments, the deployable fight recorder can be installed on other sections of the vertical tail fin, on the horizontal tail fin, on the airframe, or on either of the wings, etc.

The ADFR system 100 includes crash sensors that are used to measure or monitor various physical parameters (e.g., water immersion, inertia including acceleration and/or deceleration, structural deformation, etc.) to detect conditions of a crash or conditions with a high likelihood of leading up to a crash (hereafter collectively being referred to as a "crash condition"), and may include various different types of crash sensors corresponding to the different types of physical parameter being measured or monitored. For example, ADFR system 100 may include one or more immersion sensor(s) 122A, one or more inertia sensor(s) 224A, and/or one or more structural sensor(s) 126A-D. ADFR system 100 may also include other types of sensors such as impact pressure sensors, acoustic crash sensors, and/or radar or optical crash sensors. One or more of the crash sensors described herein can be implemented as microelectromechanical system (MEMS) sensors/switches to reduce the physical size of the sensor and to improve the accuracy of the measurements by providing finer granularities in the measurements of the physical parameter.

Each of the crash sensors can be configured to output respective crash sensor data that is used to indicate the detection of a crash condition. In some embodiments, the crash sensor data outputted by any of the crash sensors can be implemented as a sensor trigger signal that is asserted or triggered when a crash condition is detected. A crash condition is detected, for example, when the physical parameter being measured or monitored by the respective crash sensor exceeds a predetermined threshold indicative of a crash or indicative of an event with a likelihood of leading up to a crash. The crash sensor may include a switch that changes state (e.g., from an opened position to a closed position, or vice versa) when the crash sensor experiences the crash condition, and the state of the switch may be used as the sensor trigger signal. In some embodiments, the crash sensor data outputted by any of the crash sensors can be implemented as a sensor measurement (i.e. a measurement value) of the physical parameter being measured or monitored by the respective crash sensor, and the sensor measurement is continuously or periodically outputted by the respective crash sensor or outputted when a crash condition is detected. In other embodiments, the crash sensor data can be implemented as both a sensor trigger signal that is asserted or triggered when a crash condition is detected and as a continuously or periodically outputted sensor measurement. Furthermore, some of the crash sensors may only output a sensor trigger signal while other crash sensors may only output a sensor measurement, and/or any combination thereof.

Immersion sensor(s) 122A is used to detect submersion of an aircraft in a body of water. Immersions sensor(s) 122A may include submersion sensors and/or hydrostatic switches or immersion switches to detect sinking of an aircraft. Immersion sensors can be place at strategic locations on the aircraft to reliably detect the sinking of an aircraft and/or to differentiate between a safe water landing and a catastrophic crash into a body of water. For example, immersion sensor 122A can be installed on the vertical tail fin of aircraft 190 as shown in FIG. 1, and in some embodiments, can be attached to the mounting tray that holds the deployable flight recorder 130 on the vertical tail fin. At this location, immersion sensor 122A can be prevented from triggering when the aircraft safely lands on water and only the bottom portion of the belly of the aircraft is submerged in water. Although only one immersion sensor 122A is shown, it should be understood that additional immersion sensors can be used. Furthermore, immersion sensor 122A and/or additional immersion sensors can be installed at other locations of the aircraft. For example, a series of immersion sensors can be installed at various locations along the airframe. This may improve the reliability of detecting a sinking aircraft by monitoring if the immersion sensors are triggered in succession.

Inertia sensor(s) 124A are used to measure sudden changes in the velocity (acceleration and/or deceleration) of an aircraft to detect movement of the aircraft indicating a crash event. For example, inertia sensor(s) 124A can be used to detect sudden banking movements to indicate emergency attempts of a pilot to avoid a collision, sudden downward acceleration of an aircraft in free fall, or sudden deceleration of an aircraft indicating impact of the aircraft against other objects such as other aircrafts, ground structures, or bodies of water. Inertia sensor(s) 124A can be implemented as acceleration/deceleration sensors such as accelerometers or gyroscopic accelerometers, and/or G-switches such as multi-axis G-switches. Accelerometers are active measuring devices that measure changes in velocity. In contrast to accelerometers, G-switches are passive devices that react to accelerations and/or decelerations on one or more specific spatial axes and can be designed and tuned to detect specific crash profiles. For example, a G-switch can be tuned to detect free fall by triggering when the acceleration along the vertical axis exceeds a predetermined threshold.

To determine if an aircraft is experiencing a catastrophic accident or incident, an inertia sensor must be able to differentiate between severe and non-severe accelerations and/or decelerations. This can be achieved by specifying a critical crash acceleration and/or deceleration profile, a minimum acceleration and/or deceleration level, and an actuation time. The crash profile is an acceleration and/or deceleration versus time waveform corresponding to levels experienced during a crash. The predetermined threshold level can be used as a value that differentiates between severe and non-severe impacts. Inertia sensor(s) 124A can be configured to assert the sensor trigger signal when the peak accelerations and/or decelerations are above the threshold level if the time duration is long enough (e.g., exceeds the actuation time). High peak accelerations and/or decelerations with very short pulse widths and low-velocity changes do not cause the inertia sensor(s) 124A to trigger because acceleration waveforms of this type can occur routinely during normal operation or maintenance of the aircraft.

In some embodiments, inertia sensor(s) 124A can be installed at the wing box location near the center of gravity of the aircraft as shown in FIG. 1 to measure the absolute acceleration and/or deceleration of the aircraft. In other embodiments, one or more inertia sensor(s) 124A can be installed at this and/or other locations of the aircraft to detect both the absolute acceleration and/or deceleration of the aircraft as well as the relative movement of parts of the aircraft with respect to each other. For example, the sensor measurement of an inertia sensor on the wing tip can be used in combination with the sensor measurement of an inertia sensor on the aircraft body to detect the rolling movement of an aircraft. Hence, the use of multiple inertia sensors can be used to assist in differentiating between different crash profiles.

Structural sensor(s) 126A-D are used to detect deformation of the structure of the aircraft such as deformation of the exterior shell of the aircraft or structural separation of sections of the aircraft. Structural sensors 126A-D can include frangible switches to detect a crash condition. For example, a frangible switch can be a switch (e.g., a spring loaded switch) enclosed in a glass envelope. When the glass envelop is shattered by impact forces, a spacer that is used to keep the switch in the open position is released and the switch closes to assert a sensor trigger signal. Structural sensors 126A-D can be placed at strategic locations on the aircraft at sections of the aircraft that are most likely to deform by impact forces. For example, in some embodiments such as that as shown in FIG. 1, two structural sensors 126A/B can be installed in the nose of the aircraft with one structural sensor on each side of the nose, one structural sensor 126C can be installed along the belly fairing of the aircraft, and one structural sensor 126D can be installed in the lower part of the tail of the aircraft.

In addition to the various types of crash sensors described above, the ADFR system 100 according to some embodiments may also include embedded aircraft sensors that are used for maintenance and flight quality assurance. Some of these embedded aircraft sensors are used to measure structural fatigue, excessive vibrations, and other indications of abnormal operation or abnormal behavior of an aircraft. For maintenance purposes, these embedded aircraft sensors may have low triggering thresholds for identifying maintenance issues. When used in embodiments of the ADFR system 100, these embedded aircraft sensors can be programmed to trigger on a higher threshold of the measurements to identify a catastrophic failure leading to or resulting from a crash.

As indicated above, the crash sensors can be strategically placed at various locations of the aircraft to optimize the detection of a crash condition. The selection of locations on the aircraft to place the crash sensors can be based on statistical data of historic crashes. This data may include the pitch and roll of the aircraft during impact. Pitch refers to the rotational movement of the longitudinal axis (axis along the length of the aircraft) around the sideways horizontal axis (axis along the wing span) indicating an up-down movement of the aircraft nose as measured by the angle of attack. Roll refers to a rotation of the sideways horizontal axis (axis along the wing span) around the longitudinal axis (axis along the length of the aircraft) indicating an up-down movement of the wing tips as measured by the roll or bank angle.

Statistical data has shown that an aircraft is most likely to impact at the nose section of the aircraft first. In some instances, last-minute attempts by the pilot to avoid an impact can also result in the belly or the tail impacting first. Statistical data also shows that in one-third of the crashes in which data was collected, the aircraft was within a pitch of ±10 degrees of level flight at impact. Instances of high positive pitch indicating a tail strike were also observed. There has also been incidents of roll with high bank angles indicating a wing-like strike as well as inverted crashes in which the roll exceeded ±90 degrees indicating the aircraft impacted during inverted flight.

The locations of the various crash sensors as described above and as shown in FIG. 1 have been selected with some of these considerations in mind. However, it should be understood that other sensor locations can be used and additional crash sensors can be placed at other locations on the aircraft using the statistical data described above. Furthermore, it is envisioned that the locations of the placement of the various crash sensors can be modified or improved to increase the reliability of detecting a crash condition as additional crash data are collected and become available.

Figure 2:
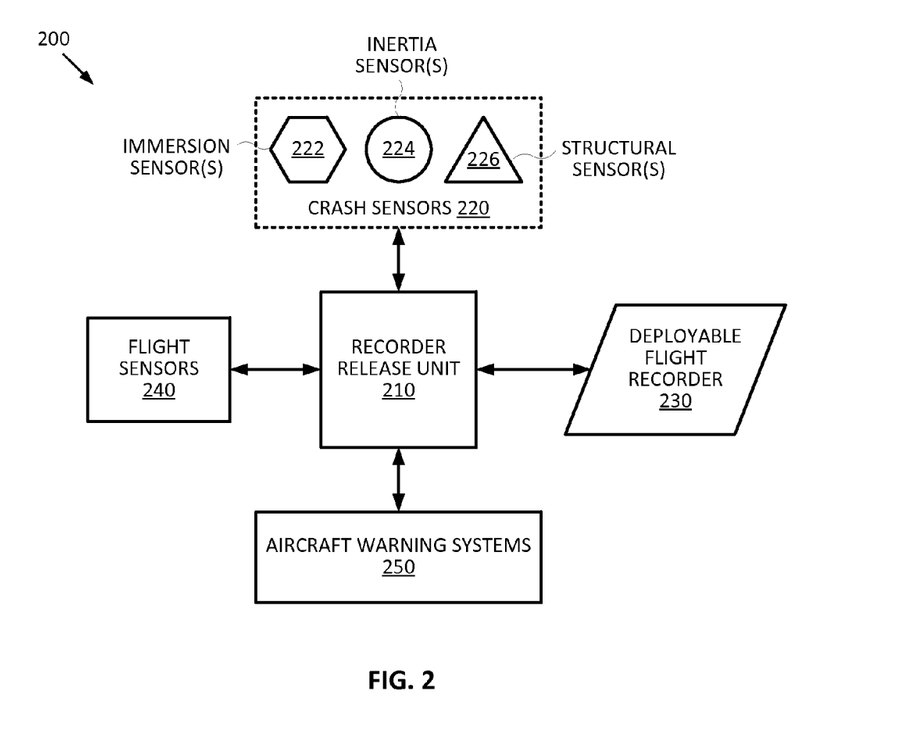
FIG. 2 illustrates a block diagram of an ADFR system according to some embodiments.

FIG. 2 illustrates a block diagram of an ADFR system 200 according to some embodiments of the invention. ADFR system 200 includes a flight recorder release unit 210 (also referred to as recorder release unit (RRU)) communicatively coupled to crash sensors 220, flight sensors 240, and aircraft warning systems 250. RRU 210 is also communicatively coupled to a deployable flight recorder 230, and is configured to activate deployment of deployable flight data recorder 230 from an aircraft when a deployment condition is detected (i.e. a deployment criteria is satisfied). As will be explained in greater detail below, the deployment criteria is based on a crash risk level that depends on the flight condition of the aircraft as indicated by flight status information from flight sensors 240 and/or danger warnings from aircraft warning systems 250. The deployment criteria changes based on the flight conditions of the aircraft and/or whether issuance of a danger warning occurs while the aircraft is in flight. RRU 210 activates deployment of deployable flight recorder 230 when the respective crash sensor data outputted from crash sensors 220 indicate the deployment criteria or deployment condition corresponding to the crash risk level is satisfied. By considering a combination of the crash sensor data from multiple crash sensors, flight conditions of the aircraft, and/or the danger warnings from aircraft warning systems, ADFR system 200 provides a much more robust and reliable system than other systems that take into account only one of these factors when making a decision as to whether a deployable flight recorder should be deployed.

Crash sensors 220 of ADFR system 200 can include one or more immersion sensor(s) 222, one or more inertia sensor(s) 224, and/or one or more structural sensor(s) 226, as described above. Crash sensors 220 may include one or more of other types of crash sensors such as an impact pressure sensor, an acoustic crash sensor, and/or a radar or optical crash sensor that are suitable for detecting a crash condition. Crash sensors 220 may also include embedded aircraft sensors as described above. One or more of crash sensors 220 may be implemented as a MEMS sensor or switch. Each of crash sensors 220 can output crash sensor data such as a sensor trigger signal that is triggered or asserted when the respective crash sensor detects a crash condition (e.g., when a measurement exceeds a threshold value and/or exceeds a threshold actuation time), and/or a sensor measurement that can be used by RRU 210 to detect the occurrence of a crash condition.

Flight sensors 240 provides flight status information to RRU 210 to enable RRU 210 to determine a real-time flight condition of the aircraft. Flight sensors 240 may include sensors on the aircraft for measuring flight status information or flight parameters such as weight-on-wheels, speed (e.g., air speed and/or ground speed), acceleration, altitude, pitch, roll, engine speed, parking brake status, landing gear status, etc. For example, flight status information of weight-on-wheels, and/or parking brake status, etc. can be used by RRU 210 as confirmation that the flight condition of the aircraft is on the ground (parked, taxiing before takeoff, or taxiing after landing). Flight status information of air speed, acceleration, altitude, pitch, roll, and/or engine speed can be used alone or in combination by RRU 210 to determine if the flight condition of the aircraft is climbing and increasing speed (e.g., taking off), descending and decreasing speed (e.g., landing), or in flight at a cruising altitude or cruising speed. In some embodiments, any combination of the flight status information can be used by RRU 210 to determine the flight condition of an aircraft. The flight status information from flight sensors 240 can be used by RRU 210 to adjust the deployment criteria based on the crash risk level of the flight condition of the aircraft.

Aircraft warning systems 250 are automatic safety systems of an aircraft that may alert the pilot of impending danger. Aircraft warning systems 250 may include Master Caution/Warning Systems, Ground Proximity Warning Systems, Collision Avoidance Systems, Stall Warning Systems, Power Loss Warning Systems, etc. Master Caution/Warning Systems are used to alert the pilot of warnings such as engine fire, hydraulic pump failure, or other critical electrical and/or mechanical failures that may cause an aircraft to crash. Ground Proximity Warning Systems are used to alert the pilot if the aircraft is in immediate danger of flying into the ground or terrain. Collision avoidance systems are used to alert the pilot of the danger of flying into obstacles such as other aircrafts. Stall Warning Systems are used to alert the pilot of a stall causing the aircraft to loose lift. Power Loss Warning Systems are used to alert the pilot of a loss in power or fuel. Warning signals from any of aircraft warning systems 250 can be used by RRU 210 to determine if the aircraft is in imminent danger of a crash.

Exemplary Crash Risk Levels and Deployment Sensitivity States

Figure 3:
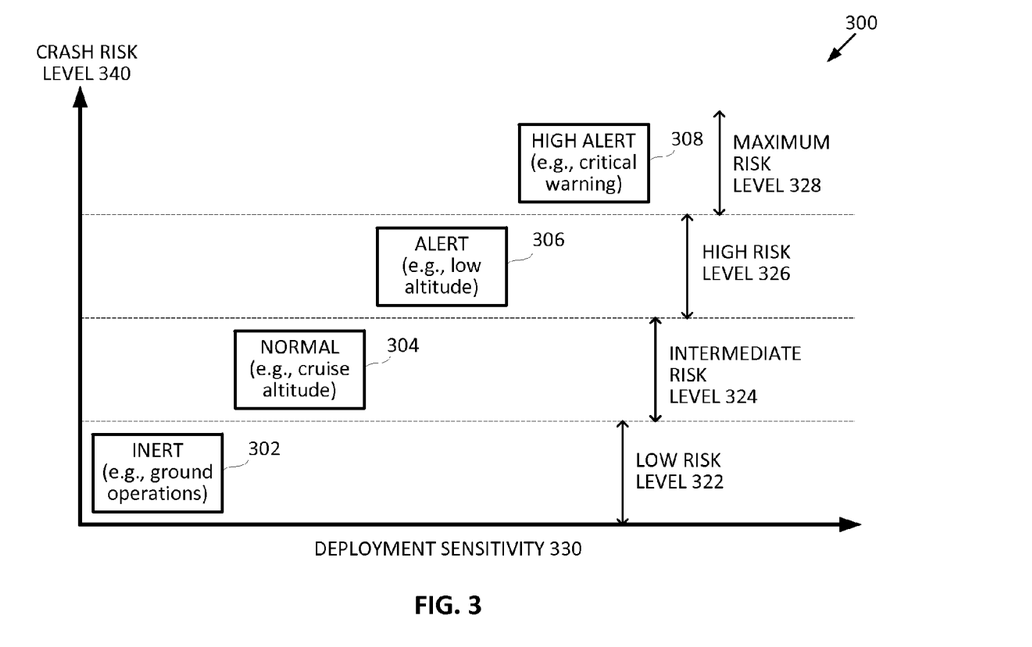
FIG. 3 illustrates a relationship between crash risk level and deployment sensitivity according to some embodiments.

FIG. 3 shows a graph 300 illustrating the relationship between the crash risk level of an aircraft and the deployment sensitivity of an ADFR system (e.g., ADFR system 100 or 200) according to embodiments of the invention. To balance the risk of a non-commanded deployment with the functionality of properly deploying during a catastrophic accident or incident, the deployment sensitivity of the ADFR system is tied to the crash risk level of the aircraft. As discussed above, the crash risk level of the aircraft depends on the flight condition of the aircraft, and is based on the flight status information received from flight sensors (e.g., flight sensors 240) on the aircraft, and can further be based on warning signals from aircraft warning systems (e.g., aircraft warning systems 250).

In graph 300 as shown in FIG. 3, the horizontal axis 330 represents increasing deployment sensitivity and the vertical axis 340 represents increasing crash risk level. Multiple gradations of different crash risk levels can be defined, for example, a low risk level 322, an intermediate risk level 324, a high risk level 326, and a maximum risk level 328. It should be understood embodiments of the invention can include the use of more or less crash risk levels. For example, in some embodiments, the maximum crash risk level 328 can be omitted, or a minimum crash risk level may be added below low risk level 322.

Each crash risk level is tied to one or more flight condition of an aircraft and/or warnings issued by the aircraft warning systems. Each crash risk level also corresponds to a deployment sensitivity state of the ADFR system. As shown in graph 300, an increase in the crash risk level corresponds to an increase in the deployment sensitivity. In other words, the higher the risk of an aircraft being involved in a catastrophic event, the fewer requirements there are in the deployment criteria to deploy the flight recorder (i.e. the ADFR system is more sensitive to conditions for triggering deployment). By coupling the deployment sensitivity state to the crash risk level, different deployment criteria can be used for different flight conditions.

For example, during ground operations, the risk of a catastrophic accident or incident is minimal. Therefore, when the flight status information of the aircraft indicates the aircraft is on the ground (e.g., when parked and/or taxiing on the runway), the crash risk level is at the low risk level 322, and the deployment sensitivity state of the ADFR system is set in an inert sensitivity state 302. In some embodiments, when in the inert sensitivity state 302, the deployable flight recorder is prevented from deploying regardless of whether any or all of the crash sensors are triggered (i.e. detect a crash condition) such that the deployable flight recorder cannot automatically release from the aircraft. This feature effectively eliminates the risk of non-commanded or unintended deployment during ground or maintenance operations. Furthermore, even if a catastrophic event does occur on the ground (e.g., collision on the runway), a flight recorder that remains undeployed and attached to the aircraft is acceptable, because recovery of the flight recorder is not expected to be a problem when the catastrophic event occurs during ground operations as compared to when the aircraft is in the air or in water. In some embodiments, the deployable flight recorder is prevented from deploying only when the aircraft is parked or below a threshold ground speed, and the deployable flight recorder is still allowed to deploy when the aircraft is above the threshold ground speed.

When the aircraft is in flight at a cruising altitude (i.e. flying at or above a predefined cruising altitude threshold) and/or at a cruising speed (i.e. flying at or faster than a predetermined cruising speed threshold) as indicated by the flight status information of the aircraft, the risk of a catastrophic accident or incident is at an intermediate risk level 324, and the deployment sensitivity state of the ADFR system is set in a normal sensitivity state 304. Having reached a cruising altitude or speed, the aircraft may be susceptible to in-flight explosion, mid-air collision, or impact with mountainous terrain, etc. However, the risk of such events is not high. Thus, the deployment criteria in the normal sensitivity state 304 to initiate deployment of a deployable flight recorder may have a greater number of requirements (i.e. reduced sensitivity) as compared to the alert and high alert sensitivity states 306 and 308 (described below). For example, the deployment criteria in the normal sensitivity state 304 may require the highest number of the crash sensors to be triggered amongst sensitivity states 304, 306, and 308 to activate deployment of the deployable flight recorder, or the measurement thresholds to trigger the crash sensors may be set to the highest levels amongst sensitivity states 304, 306, and 308. This decreases the probability of a non-commanded or unintended deployment while still allowing the deployable flight recorder to deploy during an in-flight catastrophic event.

When the aircraft is taking off during departure operations or landing during approach operations, the aircraft is in a high risk of being involved in a catastrophic accident or incident. As a result, when the flight status information of the aircraft indicates a flight condition of takeoff or landing (e.g., flying below an altitude or speed threshold, increasing or decreasing altitude or speed within a predefined range, engaging or disengaging landing gear, etc.), the crash risk level is at a high risk level 326, and the deployment sensitivity state of the ADFR system is set in an alert sensitivity state 306. The deployment criteria in the alert sensitivity state 306 to initiate deployment of a deployable flight recorder may have fewer number of requirements (i.e. increased sensitivity) as compared to the normal sensitivity states 304. For example, the deployment criteria in the alert sensitivity state 306 may require a fewer number of the crash sensors to be triggered than the normal sensitivity state 304 to activate deployment of the deployable flight recorder, or the measurement thresholds to trigger the crash sensors may be set to lower levels than the normal sensitivity state 304.

In some embodiments, the crash risk level may be elevated to a maximum risk level 328 when the automatic warning systems of an aircraft issue one or more critical warnings indicating an imminent danger (e.g., critical engine or electrical/mechanical failure). A priority or critical warning from the automatic warning systems of an aircraft indicates the highest risk of a catastrophic event. Thus, when such a warning is received, the deployment sensitivity state of the ADFR system is set in a high alert sensitivity state 308. The deployment criteria in the high alert sensitivity state 308 to initiate deployment of a deployable flight recorder may have the fewest number of requirements (i.e. highest sensitivity) as compared to the other sensitivity states. For example, the deployment criteria in the high alert sensitivity state 308 may require just one of the crash sensors to be triggered to activate deployment of the deployable flight recorder, or the measurement thresholds to trigger the crash sensors may be set at the lowest levels as compared to the other sensitivity states. Accordingly, the sensitivity states allow different trigger levels to be used in the determination of whether the deployment criteria is met. The different sensitivity states are linked to fight conditions such that the deployment criteria can be set appropriately based on the flight status information from flight sensors and warning signals from aircraft warning systems.

Figure 4:
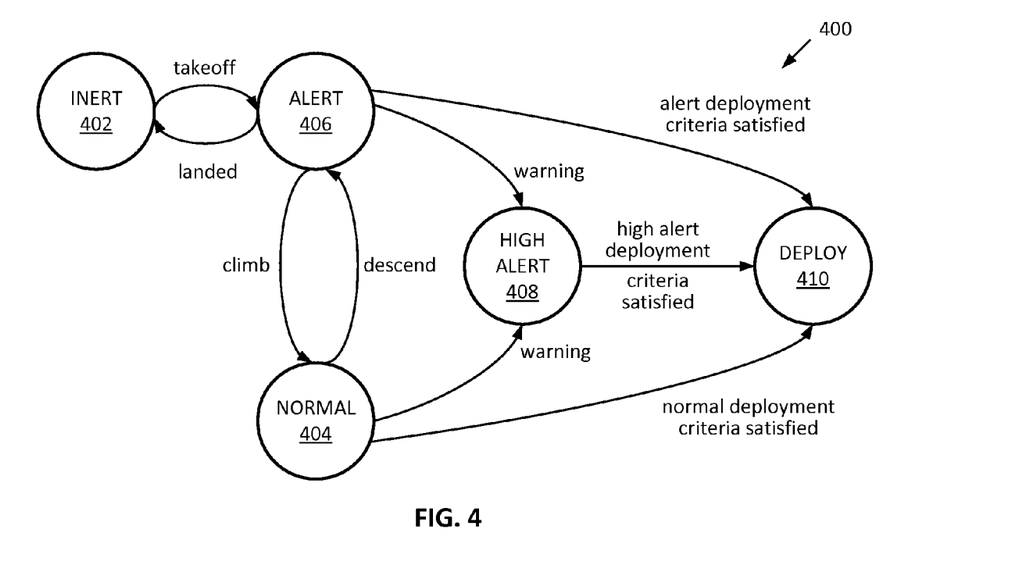
FIG. 4 illustrates a state transition diagram of an ADFR system according to some embodiments.

FIG. 4 illustrates a state transition diagram 400 of an ADFR system (e.g., ADFR system 100 or 200) according to embodiments of the invention. The state transitions correlate with the flight conditions that an aircraft may experience during flight, and is based on flight status information provided by flight sensors on the aircraft, and/or warnings issued by automatic warning systems of the aircraft. States with a similar reference number and name refers to the sensitivity states described above with reference to FIG. 3.

When the aircraft is on the ground, the ADFR system is set in the inert sensitivity state 402. In the inert sensitivity state 402, the deployment of the deployable flight recorder is disabled to avoid non-commanded or unintended deployment that may, for example, cause injuries to maintenance workers on the ground. In some embodiments, deployment is disabled even when the aircraft or its engines are turned on, or when the aircraft is moving at a ground speed on the ground (e.g., during taxiing). In other embodiments, deployment is disabled when the aircraft is parked or moving below a threshold ground speed, allowing deployment when the aircraft is moving above the threshold ground speed.

When the flight status information indicates the aircraft is taking off, the ADFR system transitions to an alert sensitivity state 406. The ADFR system transitions to an alert sensitivity state 406 when, for example, the aircraft is off the ground (e.g., no weight on wheels), or is flying at an altitude or air speed below a predefined threshold, and/or in some embodiments, moving above a ground speed threshold on the ground. Once the aircraft climbs to or reaches a cruising altitude and/or speed threshold, the ADFR system transitions to a normal sensitivity state 404. In a normal flight in which no accidents or incidents occur, the ADFR system will remain in this state until the aircraft descends below the cruising altitude and/or air speed threshold in preparation for landing. When the aircraft descends below the cruising altitude and/or air speed threshold, or when the landing gear is engaged, the ADFR system transitions back to alert sensitivity state 406. Once the aircraft has safely landed on the ground (e.g., when there is weight on wheels, or moving below a ground speed threshold), the ADFR system transitions back to the inert sensitivity state.

When the ADFR system is in the alert sensitivity state 406 during aircraft takeoff or landing, if the deployment criteria corresponding to the alert sensitivity state 406 is satisfied (e.g., when the required number of crash sensors for the alert sensitivity state 406 triggers or detects a crash condition), the ADFR system transitions to the deploy state 410 and activities or initiates deployment or release of the deployable flight recorder from the aircraft. When the ADFR system is in the normal sensitivity state 404 while the aircraft is in-flight at a cruising altitude or speed, if the deployment criteria corresponding to the normal sensitivity state 404 is satisfied (e.g., when the required number of crash sensors for the normal sensitivity state 404 triggers or detects a crash condition), the ADFR system transitions to the deploy state 410 and activities or initiates deployment or release of the deployable flight recorder from the aircraft. As indicated above, the deployment criteria to deploy the flight recorder in the normal sensitivity state 404 requires a fewer number of the crash sensors to trigger or detect a crash condition than the deployment criteria in the alert sensitivity state 406.

In some embodiments, if a priority or critical warning from an automatic warning system of the aircraft is received while the aircraft is in flight (i.e. when in alert sensitivity state 406 during takeoff or landing, or when in normal sensitivity state 404 when in-flight at a cruising altitude or speed), the ADFR system transitions to a high alert sensitivity state 408. If the deployment criteria corresponding to the high alert sensitivity state 408 is satisfied (e.g., when the required number of crash sensors for the high alert sensitivity state 408 triggers or detects a crash condition), the ADFR system transitions to the deploy state 410 and activities or initiates deployment or release of the deployable flight recorder from the aircraft. The deployment criteria in the high alert sensitivity state 408 requires the fewest number of the crash sensors to trigger or detect a crash condition to initiate or activate deployment of the deployable flight recorder from the aircraft. In some embodiments, the deployment criteria to initiate deployment in the high alert sensitivity state 408 may require just one crash sensor to trigger or detect a crash condition.

In some embodiments, once the ADFR system is set in the high alert state 408, the ADFR system may remain in this state for the duration of the flight as long as the high alert deployment criteria is not satisfied (e.g., none of the crash sensors triggers). Thus, once an automatic warning system issues a priority or critical warning, even if the warning is subsequently withdrawn, the ADFR system may remain in the high alert state 408 until the aircraft safely lands on the ground. In other embodiments, the ADFR system may transition back to the appropriate normal sensitivity state 404 or the alert sensitivity state 406 depending on the flight conditions when an issued priority or critical warning is withdrawn.

It should be understood that the crash risk levels, deployment sensitivity states, flight conditions dependency, and state transitions described above are exemplary implementations of various embodiments, and that in other embodiments, different crash risk levels, deployment sensitivity states, flight conditions dependency, and/or state transitions can be used. For example, depending on the availability of the types or number of crash sensors, flight sensors, and/or aircraft warning systems on a particular aircraft, the crash risk levels, deployment sensitivity states, flight conditions dependency, and state transitions can be modified to optimize the ADFR system for the particular aircraft.

Exemplary Flight Recorder Release Units

Figure 5:
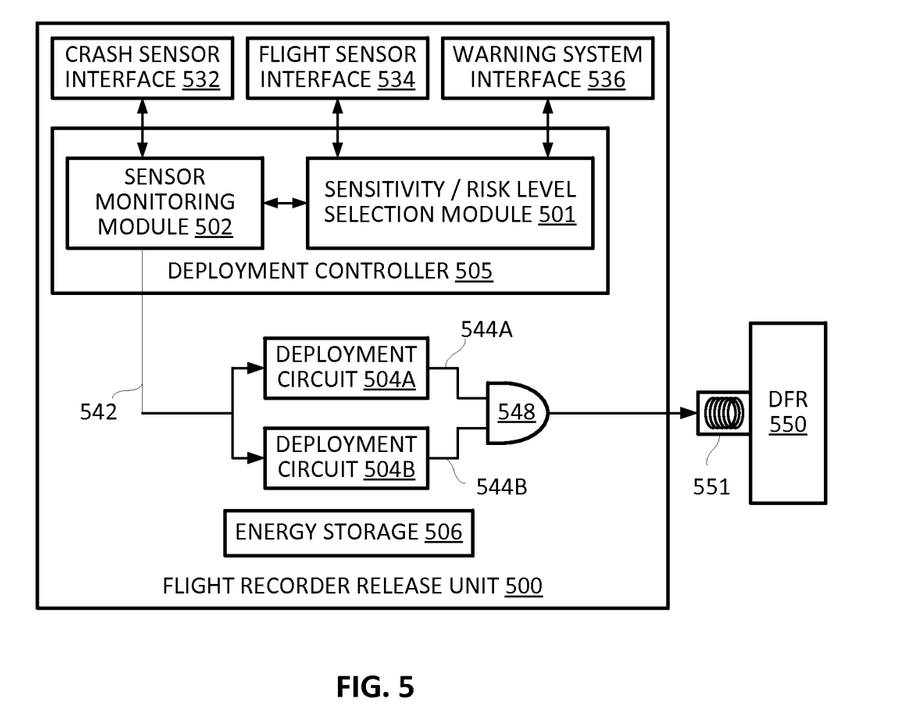
FIG. 5 illustrates a block diagram of a flight recorder release unit of an ADFR system according to some embodiments.

FIG. 5 illustrates a block diagram of a flight recorder release unit or recorder release unit (RRU) 500 of an ADFR system (e.g., ADFR system 100 or 200) according to some embodiments. RRU 500 includes a crash sensors interface 532, a flight sensor interface 534, and a warning system interface 536 coupled to a deployment controller 505. RRU 500 further includes one or more deployment circuits 504A/B coupled to the deployment controller 505 and an energy storage 506 to provide an independent power source to RRU 500 and/or the ADFR system in case the aircraft loses power in a catastrophic event. One or more components of RRU 500 can be implemented with one or more programmable logic devices (PLD) such as programmable logic array or array logic devices (PLAs/PALs), complex programmable logic devices (CPLDs), and/or field programmable gate array devices (FPGAs). In some embodiments, one or more components of RRU 500 can be implemented with one or more data processing devices such as computer processors that are coupled to a memory storing computer readable code for performing the functionalities of RRU 550.

Crash sensor interface 532 is configured to receive crash sensor data from multiple crash sensors installed at various locations on the aircraft. Crash sensor interface 532 can format or translate the crash sensor data into a suitable format for deployment controller 505. Crash sensor interface 532 may receive a discrete sensor trigger signal from each crash sensor that is triggered or asserted when a crash condition is detected by the corresponding crash sensor. For example, referring to ADFR system 100 of FIG. 1 which has five crash sensors, crash sensor interface 532 may receive five crash sensor signals, one from each of the five crash sensors in ADFR system 100. In other embodiments, any number of crash sensors can be used, and crash sensor interface 532 may receive a corresponding number of sensor trigger signals. In some embodiments, crash sensor interface 532 may receive sensor measurements (i.e. a measurement values) of the physical parameter being measured or monitored by the respective crash sensor, or both a sensor trigger signal and sensor measurements from each crash sensor.

Flight sensor interface 534 is configured to receive flight status information from any number of flight sensors of an aircraft. Flight sensor interface 534 can format or translate the flight status information into a suitable format for deployment controller 505. In some embodiments, flight sensor interface 435 may include an aircraft data bus that is used by the aircraft to communicate flight status information.

Warning system interface 536 is configured to receive warning signals from any number of aircraft warning systems of an aircraft. Warning system interface 536 can format or translate the warning signals into a suitable format for deployment controller 505. In some embodiments, warning system interface 536 may include an aircraft data bus that is used by the aircraft to communicate warnings to the cockpit instrument panel of the aircraft.

Deployment controller 505 includes a deployment sensitivity and crash risk level selection module 501, hereinafter referred to as "selection module." Selection module 501 is configured to receive flight status information from flight sensor interface 534 and warning signals from warning system interface 536. Responsive to changes in the flight status information, selection module 501 determines a flight condition of the aircraft (e.g., aircraft is on ground, takeoff or landing, or in flight at a cruising altitude) as described above. Based on the flight condition and warning signals, selection module 501 selects an appropriate crash risk level of the aircraft from a set of different gradations of crash risk levels, and sets the sensor monitoring module 502 in a sensitivity state (i.e. a deployment sensitivity state) selected from a set of different sensitivity states based on the determined crash risk level. For example, in some embodiments, the crash risk levels and the deployment sensitivity states as describe above with reference to FIG. 3 and FIG. 4 can be used.

Sensor monitoring module 502 is configured to monitor crash sensor data from crash sensor interface 532 to determine if a deployment criteria corresponding to the sensitivity state set by the selection module 501 is satisfied to initiate or activate deployment of a deployable flight recorder 550 from an aircraft. In some embodiments, sensor monitoring module 502 may include a table or other data structure that stores a set of deployment criteria corresponding to the different sensitivity states. The deployment criteria of each sensitivity state can be defined as a number of crash sensors or sensor trigger signals that are required to be triggered or asserted (i.e. when a crash condition is detected) to initiate or activate deployment. In some embodiments in which the sensor monitoring module 502 receives sensor measurements (i.e. measurement values) from crash sensor interface 532, the deployment criteria can, in addition or alternatively, be defined as a measurement threshold that is compared with the received sensor measurement to determine if the respective crash sensor has detected a crash condition. In addition to defining the number of crash sensors that are required to be triggered to affect deployment, the deployment criteria can also include different measurement thresholds of one or more of the crash sensors that can be adjusted for the different sensitivity states. For example, the measurement threshold for triggering a crash sensor can be reduced to increase the triggering sensitivity of the crash sensor to correspond to an increase in the sensitivity state of the system.

In some embodiments, sensor monitory module 502 may also include voting logic that takes into account the characteristics of the crash sensors when determining if a deployment criteria is satisfied. For example, voting logic in sensor monitory module 502 may take into account the reliability of the respective crash sensor, the sensor type (the type of physical parameter being measured) of respective crash sensor, and/or the sensor location on the aircraft of the respective crash sensor when determining if a deployment criteria is satisfied. In some embodiments, the voting logic may assign a weighted value to each crash sensor based on any one or more of these characteristics. The weight values can be adjusted based on the sensitivity state, and the deployment criteria for each sensitivity state can further be based on the weighted values of the respective crash sensor. For example, a deployment criteria of a sensitivity state can be defined as a numeric value, and the deployment criteria is satisfied if the sum of the weight values of the crash sensors that have triggered exceeds the numeric value.

The voting logic in sensor monitoring module 502 can also be used to resolve potential conflicting inputs from the crash sensors to determine the appropriate outcome. For example, if a structural sensor is triggered, but an inertia sensor does not trigger, the voting logic may determine that the triggering of the structural sensor overrides the input from the inertia sensor. The voting logic may make this determination based on the respective reliabilities of the crash sensors (e.g., in this case, the structural sensor may be more reliable than the inertia sensor), or other characteristics of the crash sensors as describe above.

In some embodiments, sensor monitoring module 502 may also provide a built-in test function that continuously monitors the crash sensors for sensor malfunction while in flight to ensure proper operation of the crash sensors. The voting logic may remove those of the crash sensors determined to have malfunctioned from the deployment criteria. The built-in test function may monitor continuity or connectivity of the sensor monitoring module 502 to each of the crash sensors. In some embodiments, a loss of continuity to multiple independently wired crash sensors may indicate a catastrophic event. As such, the voting logic may further take into account continuity losses to the crash sensors as an additional trigger when determining if a deployment criteria is satisfied.

When sensor monitoring module 502 determines that a deployment criteria corresponding to the sensitivity state selected by the selection module 501 is satisfied as indicated by the crash sensor data input, the sensor monitoring module 502 and/or the deployment controller 505 enables the one or more deployment circuits 504A/B to initiate or activate deployment of deployable flight recorder 550 from the aircraft, for example, by asserting a deployment enable signal 542 to the one or more deployment circuits 504A/B. In some embodiments, more than one deployment circuit 504A/B can be used as shown, although other embodiments may use just one deployment circuit. In response to receiving an asserted deployment enable signal 542, each of the one or more deployment circuits 504A/B transmits a deployment signal 544A/B. The deployment signals 544A/B can be logically ANDed together, for example, by an AND gate 548, and the output of AND gate 548 is transmitted to a release mechanism 551 (e.g., a spring loaded actuator) to deploy or release the deployable flight recorder 550 from the aircraft. By providing redundant deployment circuits 504A/B, if any one of the deployment circuits 504A/B malfunctions and erroneously transmits a deployment signal, the deployment signal from the malfunctioning deployment circuit would not be propagated to the release mechanism 551, and thus non-commanded or unintended deployment of the deployable flight recorder 550 due to a malfunctioning deployment circuit can be prevented.

Figure 6:
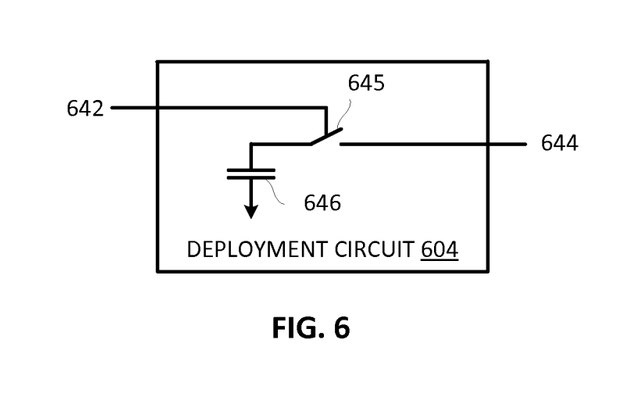
FIG. 6 illustrates a functional diagram of a deployment circuit of an ADFR system according to some embodiments.

FIG. 6 illustrates a functional diagram of a deployment circuit 604 according to various embodiments. Deployment circuit 604 may include an energy storage element 646 such as a capacitor coupled to a switching element 645. When deployment circuit 604 receives an asserted deployment enable signal 642, the switching element 645 changes from an opened state to a closed state to couple or connect the energy storage element 646 to the output of deployment circuit 604, and the energy stored in the energy storage element 646 (e.g., an electrical charge, current, or voltage) is applied to the output to generate a deployment signal 644 that is used to initiate or active deployment of a deployable flight recorder. As discussed above, when the ADFR system is in an inert sensitivity state corresponding to a low crash risk level, deployment of a deployable flight recorder is disabled. This feature can be implemented in deployment circuit 604 by discharging or de-energizing the energy storage element 646 when the ADFR system is in the inert sensitivity state. This would ensure that even if the sensor monitoring module correctly or erroneously asserts the deployment enable signal 642 causing switching element 645 to close, the deployment signal 644 would not be asserted because there is no energy stored in energy storage element 646 when the system is in the inert sensitivity state. Upon exiting the inert sensitivity state, the energy storage element 646 can be recharged or re-energized to provide an electrical charge, current, or voltage to generate the deployment signal 644 when a deployment criteria is satisfied.

Exemplary Deployable Flight Recorders and Emergency Locator Transmitters

Figure 7:
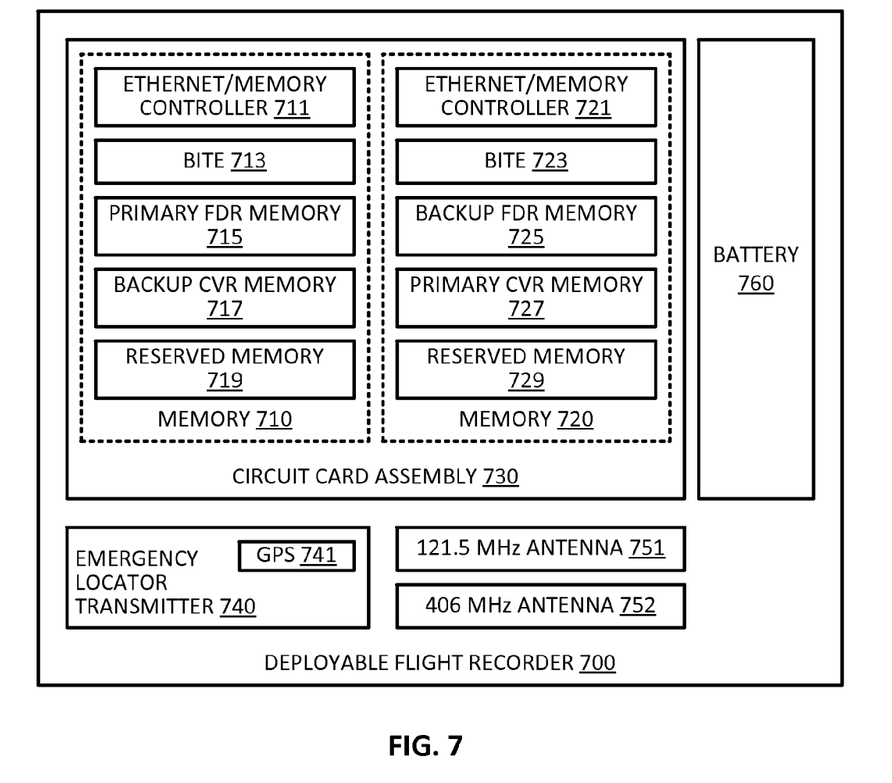
FIG. 7 illustrates a block diagram of a deployable flight recorder according to some embodiments.

FIG. 7 shows a block diagram of a deployable flight recorder 700 that can be used in an ADFR system (e.g., ADFR system 100 or 200) according to some embodiments. Deployable flight recorder 700 may include cockpit voice recorder (CVR) functionality, or a flight data recorder (FDR) functionality, or a combination of both as shown in FIG. 7. The components of deployable flight recorder 700 are protected by a housing to ensure that critical flight information survives a crash, and is rapidly recovered by search and rescue personnel. In some embodiments, the housing may have an exterior shaped as an airfoil to provide lift for the deployable flight recorder 700 when the recorder separates from the aircraft.

The deployable flight recorder 700 includes a crash-survivable circuit card assembly (CCA) 730, which contains storage memory (e.g., solid state memory) to record audio and/or flight data. In some embodiments, CCA 730 may have a redundant dual-memory architecture as shown in FIG. 7 to mitigate against the loss of data if one memory fails. The dual-memory architecture utilizes two separate memory units 710 and 720, each with an independent Ethernet interface and memory controller 711/721 to provide data from the aircraft to the memory units 710 and 720. Each of the memory unit 710 and 720 may also include a built-in test (BITE) unit 713/723 to ensure proper operation of the memory unit and to flag an error to request for maintenance when the memory unit malfunctions.

The storage memory in each memory units 710 and 720 can be partitioned into three storage areas: (1) flight data memory partition of 1 gigabyte sufficient for 25 hours of recording at up to 8192 words per second; (2) cockpit voice data memory partition of 512 megabytes sufficient for 2 hours of voice recording; and (3) reserved memory partition of 16 gigabytes for future expansion (e.g., sufficient for 2 hours of cockpit image recording). It should be understood that these memory partition sizes are illustrative and not restrictive, and that in alternative embodiments, other memory partition sizes or total memory in the memory units can be used. For example, in another embodiment, the memory partitions and the memory units may have double the memory capacities as those described above.

The first memory unit 710 contains the primary memory for FDR 715, the backup memory for CVR 717, and a reserved memory 719 for future expansion. The second memory unit 720 contains the primary memory for CVR 727, the backup memory for FDR 725, and a reserved memory 729 for future expansion. By separating the primary memories for FDR and CVR into separate memory units, in the event of a failure of one of the memory interfaces affecting the FDR or CVR data, the data from the remaining function can still recorded. Furthermore, by providing a backup memory in one memory unit to back up the primary data of the other memory unit (instead of backing up the same data within the same memory unit), even in the event of a failure of the backup communication link, both CVR and FDR data would be recorded in their primary memory banks of the respective memory units to ensure data continuity.

According to some embodiments, deployable flight recorder 700 may further include an emergency locator transmitter (ELT) unit 740, and at least one of a 121.5 MHz antenna 751 or 406 MHz antenna 752 for broadcasting an ELT signal at the respective frequency. The ELT unit 740 is a beacon transmitter that interfaces with COSPAS-SARSAT international satellite system for search and rescue. The ELT unit 740 may be a dual frequency 121.5/406 MHz ELT as shown that provides crash reporting and location identification to the COSPAS-SARSAT system. The 406 MHz beacon includes encoding of the last known location of the aircraft prior to deployment of the deployable flight recorder. The ELT unit 740 may receive information on the last known location of the aircraft from one of the memory units 710 of 720. In some embodiments, the ELT unit 740 may include an integrated GPS unit 741 to determine the last known location of the aircraft prior to deployment of the deployable flight recorder 700, and to provide position information of the deployable flight recorder 700 after separation from the aircraft.

The ELT unit 740 can transmit for a minimum of, for example, 24 hours, 48 hours, or 50 hours at the 406 MHz frequency and 150 hours at the 121.5 MHz frequency. The deployable flight recorder 700 collects location data, universal time data, and aircraft tail ID from one or more aircraft data buses or communication links. The location data and aircraft tail ID collected by the deployable flight recorder 700 prior to deployment are provided to the ELT unit 740. The ELT unit 740 transmits the location data in the COSPAS-SARSAT 406 MHz long form message, providing the last known latitude and longitude of the aircraft at the instant the deployable flight recorder 700 is deployed. The ELT uses the tail ID as the identification of the particular aircraft and inserts this data in the long or short form message. Provisioning of the tail ID data from the aircraft data buses and/or communication links enables the deployable flight recorder 700 to be moved from aircraft to aircraft without the need for reprogramming of flight recorder. Universal time data allows the recorded FDR and CVR data and ELT transmission to be associated with real time, and allows CVR and FDR data to be synchronized during ground replay of the collected data.

Upon deployment of the deployable flight recorder 700 from the aircraft, the CVR and FDR recording ceases as the memory units 710 and 720 and their support circuits are unpowered. A battery 760 in deployable flight recorder 700 provides the power to the ELT unit 740 to ensure the ELT unit 740 will continue to broadcast emergency transmissions following the impact with the ground or water and the recorded data will be preserved.

In some embodiments, the ELT unit 740 is activated to commence broadcasting of the ELT signal at the 121.5 MHz and 406 MHz frequencies upon impact of the deployable flight recorder 700 on the ground or at sea after separation form the aircraft. In other embodiments, the ELT unit 740 can be activated while the aircraft and/or the deployable flight recorder 700 is still in the air to provide in-flight ELT transmission. Legacy COSPAS-SARSAT satellites are not optimized to track a moving beacon. However, with the implementation of MEOSAR (Medium Earth Orbit Search and Rescue) satellite system, the location of a beacon signal can be determined from a single transmission burst. This allows continuous detection, location, and tracking of a moving beacon. Accordingly, the ELT unit 740 according to various embodiments can be activated prior to deployment of the deployable flight recorder 700 or immediately after deployment to commence in-flight ELT transmission. Initiating the ELT transmission while in flight can provide search and rescue with crucial extra minutes to locate the deployable flight recorder and the crash site to provide emergency aid or to rescue passengers who survive the initial impact from crash fires to increase their chances of survival.

Figure 8:
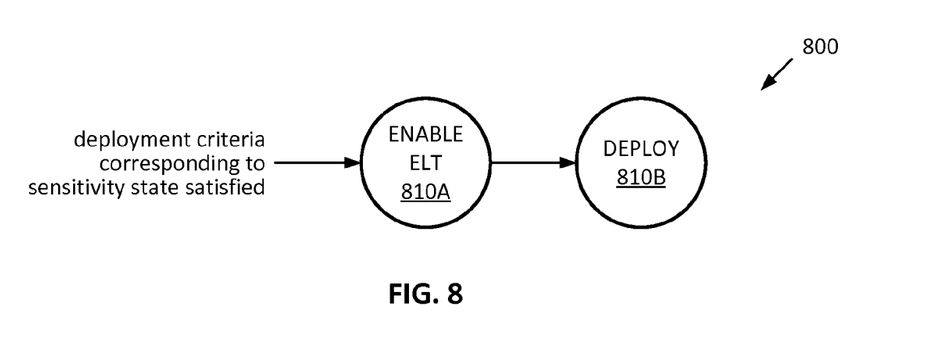
FIG. 8 illustrates an alternative state transition diagram of an ADFR system according to some embodiments.

FIG. 8 illustrates a portion of a state transition diagram 800 of an ADFR system (e.g., ADFR system 100 or 200) according to some embodiments of the invention that can be used to provide in-flight ELT transmission. In these embodiments, the portion of the state diagram 800 shown in FIG. 8 parallels the deploy states 408 and 410 of state diagram 400 shown in FIG. 4. State 810A is activated when state 408 is activated, and state 810B is activated when state 410 is activated. Besides these states of state transition diagram 400, the remaining portions of the state transition diagrams 400 and 800 are similar, and thus the similar portions are not shown in FIG. 8.

When the ADFR system determines that the aircraft is at a high risk level and sets the deployment sensitivity to a high alert state, the system automatically activates the ELT transmission (state 810A) while the deployable flight recorder is still captive to the aircraft. If the deployment criteria for the high alert states is satisfied, then the ADFR system will transition to the deploy state 810B). If the deployable flight recorder is deployed from either state 404 or state 406, the ELT will automatically begin transmitting once the deployable flight recorder is released.

In some embodiments, the deployable flight recorder can also be configured such that when the power supply from the aircraft is removed when the deployable flight recorder is deployed, the deployable flight recorder automatically activates the ELT unit 740 immediately upon detecting the loss of the power supply from the aircraft while in flight.

Although the in-flight ELT transmission has been described above with reference to an ELT unit that is integrated in the deployable flight recorder, it should be understood that in other embodiments of the invention, in-flight ELT transmission can be activated on a ELT unit that is not integrated within a flight recorder, but affixed to or located elsewhere on the aircraft.

Exemplary Methods for Affecting Deployment of Flight Recorder

Figure 9:
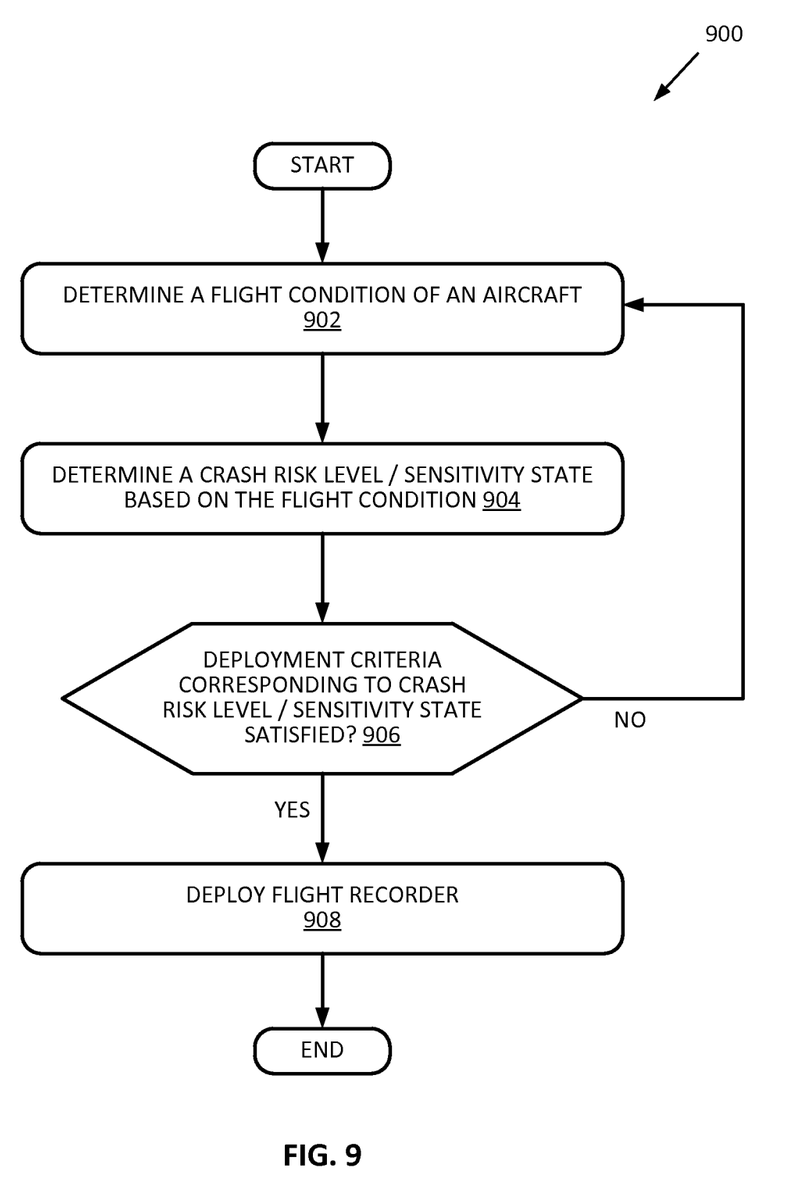
FIG. 9 illustrates a flow diagram for initiating deployment of a deployable flight recorder according to some embodiments.

FIG. 9 illustrates a flow diagram 900 of a process for initiating or activating deployment of a deployable flight recorder that can be used by a ADFR system (e.g., ADFR system 100 or 200) according to various embodiments. At block 902, the flight condition of an aircraft is determined.

The flight condition can be based on flight status information from flight sensors of an aircraft and/or warning signals from one or more aircraft warning systems as described above. Upon determining the flight condition of the aircraft, at block 904, the crash risk level of the aircraft and/or the deployment sensitivity state of the ADFR system is determined based on the flight condition of the aircraft determined in block 902. The crash risk level can be selected from different gradations of crash risk levels, and the deployment sensitivity state can be selected from a set of deployment sensitivity states each corresponding to a crash risk level as described above.

At block 906, crash sensor data from crash sensors are used to determine if a deployment criteria corresponding to the determined crash risk level and/or deployment sensitivity state is satisfied. The deployment criteria is dependent on the flight condition of the aircraft and can be adjusted based on changes in the flight condition according to the details provided above. If the crash sensor data indicates that the deployment criteria is satisfied, deployment of the deployable flight recorder from the aircraft is initiated at block 908. If the deployment criteria is not satisfied, the process is repeated at block 902 for the duration of the flight.

Figure 10:
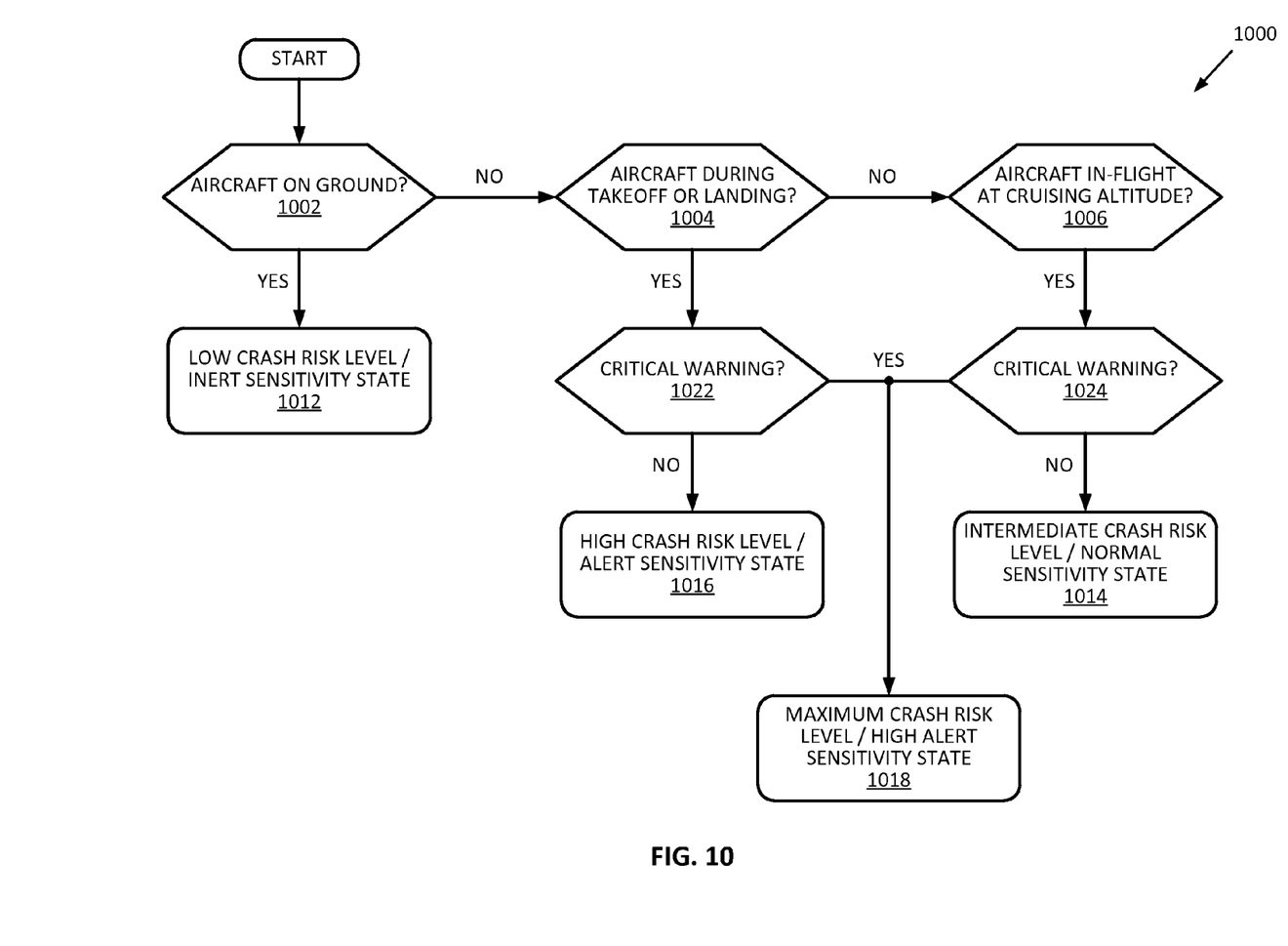
FIG. 10 illustrates a flow diagram for determining the crash risk level of an aircraft and/or deployment sensitivity state of an ADFR system according to some embodiments.

FIG. 10 illustrates a flow diagram 1000 of a process for determining a crash risk level and/or deployment sensitivity state of a ADFR system (e.g., ADFR system 100 or 200) according to various embodiments. At block 1002, it is determined if an aircraft is on the ground (e.g., parked or taxiing) based on flight status information from the flight sensors of the aircraft, according to the details described above. If it is determined that the aircraft is on the ground, at block 1012, the aircraft is determined to be at a low crash risk level, and the deployment sensitivity state of the ADFR system is set to the inert sensitivity state as described above.

If the flight condition of the aircraft is not on the ground, at block 1004, it is determined if the aircraft is taking off or landing based on flight status information from the flight sensors of the aircraft. If it is determined that the aircraft is taking off or landing, then at block 1022, it is determined if an aircraft warning system has issued a priority or critical warning indicative of an imminent danger. If no warning is received, at block 1016, the aircraft is determined to be at a high crash risk level, and the deployment sensitivity state of the ADFR system is set to an alert sensitivity state as described above. If a warning is received, at block 1018, the aircraft is determined to be at a maximum crash risk level, and the deployment sensitivity state of the ADFR system is set to a high alert sensitivity state as described above.

If the flight condition of the aircraft is not on the ground and is not taking off or landing, then at block 1006, the aircraft is determined to be in flight at a cruising altitude or speed. At block 1024, it is determined if an aircraft warning system has issued a priority or critical warning indicative of an imminent danger. If no warning is received, at block 1014, the aircraft is determined to be at an intermediate crash risk level, and the deployment sensitivity state of the ADFR system is set to a normal sensitivity state as described above. If a warning is received, at block 1018, the aircraft is determined to be at a maximum crash risk level, and the deployment sensitivity state of the ADFR system is set to a high alert sensitivity state as described above.

Although the processes illustrated in the flow diagrams above have been described with reference to a particular set of operations and a particular order of operations, it should be understood that in other embodiments of the invention, the processes describe herein can omit one or more of the operations, include one or more additional operations, or both, and that the order of operations can be modified or rearranged and still achieve the objectives of the processes.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as random access memory (RAM), read only memory (ROM), Flash memory, solid-state memory, a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A flight recorder release unit comprising: one or more deployment circuits for transmitting a deployment signal to deploy a fight recorder from an aircraft; a deployment controller coupled to the one or more deployment circuits, the deployment controller including: a sensor monitoring module that enables the one or more deployment circuits to transmit the deployment signal when crash sensor data from a plurality of crash sensors indicate a deployment criteria corresponding to a sensitivity state of the sensor monitoring module is detected; and a sensitivity selection module that sets the sensitivity state of the sensor monitoring module to be in one of a plurality of sensitivity states based on flight status information of the aircraft, wherein the plurality of sensitivity states include a low sensitivity state when the flight status information indicate the aircraft is on the ground, a normal sensitivity state when the flight status information indicate the aircraft is cruising in flight, and an alert sensitivity state when the flight status information indicate the aircraft is taking off or landing.

2. The flight recorder release unit of claim 1, wherein the sensor monitoring module disables the one or more deployment circuits when the sensor monitoring module is in a low sensitivity state to prevent deployment of the flight recorder.

3. The flight recorder release unit of claim 1, wherein the deployment criteria in the normal sensitivity state requires a greater number of the crash sensors to trigger than the deployment criteria in the alert sensitivity state.

4. The flight recorder release unit of claim 1, wherein the plurality of sensitivity states further includes a high alert sensitivity state, and the deployment criteria in the high alert sensitivity state requires a fewer number of the crash sensors to trigger than the deployment criteria in the alert sensitivity state.

5. The flight recorder release unit of claim 4, wherein the deployment criteria in the high alert sensitivity state requires just one of the crash sensors to trigger.

6. The flight recorder release unit of claim 4, wherein the sensor monitoring module is set in the high alert sensitivity state when the sensitivity selection module receives a warning signal from an aircraft warning system.

7. The flight recorder release unit of claim 1, wherein the sensor monitoring module further monitors each of the crash sensors for sensor malfunction while in flight, and removes those of the crash sensors determined to have malfunctioned from the deployment criteria.

8. The flight recorder release unit of claim 4, wherein the deployment controller transmits an ELT (emergency locator transmitter) activation signal to the flight recorder to initiate in-flight transmission of an ELT signal from the flight recorder when in the high alert sensitivity state.

9. The flight recorder release unit of claim 1, wherein the deployment criteria is further based on weighted values of the crash sensors, wherein the weighted values are based on at least one of:
reliability of the respective crash sensor;
sensor type of the respective crash sensor; or
location on the aircraft of the respective crash sensor.

10. The flight recorder release unit of claim 1, wherein the one or more deployment circuits include two deployment circuits, and the fight recorder is deployed from the aircraft only when both deployment circuits transmit the deployment signal.

11. A method for activating deployment of a deployable flight recorder from an aircraft using a plurality of crash sensors on the aircraft, the method comprising: determining a flight condition of the aircraft; determining one of a plurality of crash risk levels based on the flight condition of the aircraft, wherein the plurality of crash risk levels include a low crash risk level corresponding to the flight condition of the aircraft being on the ground, an intermediate crash risk level corresponding to the flight condition of the aircraft being at a cruising altitude or cruising speed, and a high crash risk level corresponding to the flight condition of the aircraft during takeoff or landing; and activating the deployment of the deployable flight recorder from the aircraft when a deployment criteria corresponding to the determined crash risk level is satisfied, wherein the deployment criteria is based on crash sensor data from the plurality of crash sensors.

12. The method of claim 11, wherein when the determined crash risk level is the low crash risk level, the deployment of the deployable flight recorder is disabled regardless of the crash sensor data of the crash sensors.

13. The method of claim 11, wherein an increase in the crash risk level corresponds to an increase in the sensitivity of the crash sensors or to a decrease in the number of the crash sensors that are required to trigger to activate the deployment of the deployable flight recorder.

14. The method of claim 11, wherein the plurality of crash risk levels further includes a maximum crash risk level, and the deployment criteria of the maximum crash risk level requires a fewer number of the crash sensors to trigger to activate the deployment of the deployable flight recorder than the deployment criteria of the high crash risk level.

15. The method of claim 14, wherein the deployment criteria of the maximum crash risk level requires just one crash sensor to trigger to activate the deployment of the deployable flight recorder.

16. The method of claim 14, wherein the crash risk level is elevated to the maximum crash risk level from either the intermediate crash risk level or from the high risk level when an aircraft warning system of the aircraft issues a warning of an imminent danger.

17. The method of claim 11, further comprising:
monitoring each of the crash sensors for sensor malfunction while in flight; and
removing those of the crash sensors determined to have malfunctioned from the deployment criteria.

18. The method of claim 11, further comprising:
initiating in-flight transmission of an ELT signal when an aircraft warning system of the aircraft issues a warning of an imminent danger.

19. The method of claim 11, wherein the deployment criteria is further based on weighted values of the crash sensors, wherein the weighted values are based on at least one of:
reliability of the respective crash sensor;
sensor type of the respective crash sensor; or
location on the aircraft of the respective crash sensor.

20. A automatic deployable flight recorder system comprising: a deployable fight recorder; a plurality of crash sensors; and a recorder release unit communicatively coupled to the deployable fight recorder and the plurality of crash sensors, the recorder release unit configured to initiate deployment of the deployable flight data recorder from an aircraft when a deployment criteria that is adjusted based on a flight condition of the aircraft is satisfied, wherein the deployment criteria is adjusted based on whether the flight condition indicates the aircraft is on the ground, the flight condition indicates the aircraft is cruising in flight, or the flight condition indicates the aircraft is taking off or landing.

21. The automatic deployable flight recorder system of claim 20, wherein the flight recorder release unit transmits an ELT (emergency locator transmitter) enable signal to the deployable flight recorder to initiate in-flight transmission of an ELT signal from the deployable flight recorder when the deployment condition is detected.

22. The automatic deployable flight recorder system of claim 20, wherein the deployment condition is further based on weighted values of the respective crash sensor, wherein the weighted values are based on at least one of:
reliability of the respective crash sensor;
sensor type of the respective crash sensor; or
location on the aircraft of the respective crash sensor.

23. The automatic deployable flight recorder system of claim 20, wherein the plurality of crash sensors include one or more of an water immersion sensor, an inertia sensor, or a frangible switch sensor.

24. The automatic deployable flight recorder system of claim 20, wherein the plurality of crash sensors include one or more crash sensors placed at a nose of the aircraft, one or more crash sensors placed at a belly of the aircraft, and one or more crash sensors placed at a tail fin of the aircraft.

25. The automatic deployable flight recorder system of claim 20, wherein at least one of the crash sensors is implemented as a microelectromechanical (MEMS) sensor.

* * * * *

UNITED STATES PATENT AND TRADEMARK OFFICE
CERTIFICATE OF CORRECTION

Page 1 of 1

PATENT NO. : 8,706,357 B1
APPLICATION NO. : 13/830248
DATED : April 22, 2014
INVENTOR(S) : Blake van den Heuvel, Ari Kaufmann and Vincent James O'Hara It is certified that error appears in the above-identified patent and that said Letters Patent is hereby corrected as shown below:

On the title page, (57) Abstract, line 3, please delete "fight"; and insert --flight--;

On the title page, (57) Abstract, line 5, please delete "fight"; and insert --flight--;

In the Specification

In column 2, line 6, please delete "fight"; and insert --flight--;

In column 2, line 9, please delete "fight"; and insert --flight--;

In column 2, line 17, please delete "fight"; and insert --flight--;

In column 3, line 48, please delete "fight"; and insert --flight--;

In column 9, line 58, please delete "fight"; and insert --flight--;

In the Claims

In claim 1, column 18, line 40, please delete "fight"; and insert --flight--;

In claim 10, column 19, line 30, please delete "fight"; and insert --flight--;

In claim 20, column 20, line 25, please delete "A"; and insert --An--;

In claim 20, column 20, line 26, please delete "fight"; and insert --flight--;

In claim 20, column 20, line 28, please delete "fight"; and insert --flight--;

In claim 23, column 20, line 52, please delete "an water"; and insert --a water--.

Signed and Sealed this
Eighth Day of July, 2014

Michelle K. Lee
*Deputy Director of the United States Patent and Trademark Office*